(12) United States Patent
Suzuki et al.

(10) Patent No.: US 12,046,971 B2
(45) Date of Patent: Jul. 23, 2024

(54) ELECTRIC DRIVING DEVICE AND ELECTRIC POWER STEERING DEVICE

(71) Applicant: Mitsubishi Electric Corporation, Tokyo (JP)

(72) Inventors: Junya Suzuki, Tokyo (JP); Akira Kimishima, Tokyo (JP); Takahisa Kawaguchi, Tokyo (JP); Takanori Ichikawa, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 397 days.

(21) Appl. No.: 17/604,001

(22) PCT Filed: Jun. 27, 2019

(86) PCT No.: PCT/JP2019/025663
§ 371 (c)(1),
(2) Date: Oct. 15, 2021

(87) PCT Pub. No.: WO2020/261495
PCT Pub. Date: Dec. 30, 2020

(65) Prior Publication Data
US 2022/0209612 A1 Jun. 30, 2022

(51) Int. Cl.
*H02K 3/50* (2006.01)
*B62D 5/04* (2006.01)
*H02K 5/22* (2006.01)

(52) U.S. Cl.
CPC ............ *H02K 3/50* (2013.01); *B62D 5/0406* (2013.01); *H02K 5/225* (2013.01); *H02K 2203/09* (2013.01)

(58) Field of Classification Search
CPC .. H02K 3/00; H02K 3/04; H02K 3/50; H02K 3/52; H02K 3/522; H02K 5/00;
(Continued)

(56) References Cited

FOREIGN PATENT DOCUMENTS

| JP | 9-215234 A | 8/1997 |
| JP | 2003148344 A | 5/2003 |

(Continued)

OTHER PUBLICATIONS

Japanese Office Action dated Jan. 10, 2023 in Japanese Application No. 2021-528792.
(Continued)

*Primary Examiner* — Tran N Nguyen
(74) *Attorney, Agent, or Firm* — Sughrue Mion, PLLC; Richard C. Turner

(57) ABSTRACT

Provided is an electric driving device including a first protruding portion protruding from a holder surface. A plate-like portion has an opposed surface opposed to the holder surface. A first through hole in the plate-like portion is defined by a first through hole forming portion formed in a cylindrical shape so as to project from the plate-like portion to a side opposite to the opposed surface. The first through hole has an inner surface including a first hole inclined inner surface and a first hole cylindrical inner surface extending from the first hole inclined inner surface to the end portion of the first through hole forming portion. The first protruding portion is press-fitted into the first through hole under a state in which a plurality of first ribs are in contact with the first hole cylindrical inner surface.

10 Claims, 15 Drawing Sheets

(58) Field of Classification Search
CPC ........ H02K 5/225; H02K 11/00; H02K 11/33;
H01R 3/50; H01R 25/16; H01R 33/973;
B62D 5/04; B62D 5/0406; B62D 5/10;
B62D 5/065
See application file for complete search history.

(56) References Cited

FOREIGN PATENT DOCUMENTS

| | | | |
|---|---|---|---|
| JP | 2012252811 A | * | 12/2012 |
| JP | 2018-061423 A | | 4/2018 |
| WO | 2019/102643 A1 | | 5/2019 |

OTHER PUBLICATIONS

International Search Report of PCT/JP2019/025663 dated Aug. 27, 2019 [PCT/ISA/210].

* cited by examiner

ELECTRIC DRIVING DEVICE AND ELECTRIC POWER STEERING DEVICE

CROSS REFERENCE TO RELATED APPLICATIONS

This application is a National Stage of International Application No. PCT/JP2019/025663 filed on Jun. 27, 2019.

TECHNICAL FIELD

This invention relates to an electric driving device including a motor and a control unit, and to an electric power steering device.

BACKGROUND ART

Hitherto, there has been known an electric power steering device including a bus bar held on a holder. The holder is provided inside a control unit, and has protruding portions made of a resin. The bus bar has through holes. When the protruding portions are press-fitted into the through holes, the bus bar is held on the holder. Each of the protruding portions has a columnar portion and a plurality of ribs formed on an outer peripheral surface of the columnar portion. The plurality of ribs are in contact with an inner surface of the through hole of the bus bar. Further, end portions of the protruding portions are welded to the bus bar through heating (see, for example, Patent Literature 1).

CITATION LIST

Patent Literature

[PTL 1] JP 2018-61423 A

SUMMARY OF INVENTION

Technical Problem

In the case of the related-art electric power steering device disclosed in Patent Literature 1, the end portions of the protruding portions are required to be heated so as to be welded to the bus bar. Thus, time and effort are needed to manufacture the electric power steering device.

Further, in the case of the related-art electric power steering device, when the protruding portions are press-fitted into the through holes, the ribs are liable to be scraped by an edge of an opening portion of the through hole. As a result, shavings are more liable to be generated from the ribs as foreign matter.

This invention has been made to solve the problems described above, and has an object to provide an electric driving device and an electric power steering device that are easily manufactured and enable suppression of generation of foreign matter at the time of manufacture.

Solution to Problem

According to this invention, an electric driving device and an electric power steering device includes: a motor; and a control unit configured to control the motor, wherein the control unit includes: a holder having a holder surface; and a bus bar arranged on the holder surface, wherein the bus bar has a plate-like portion placed on the holder surface in an overlapping manner, wherein the plate-like portion has an opposed surface opposed to the holder surface, wherein the holder has a first protruding portion protruding from the holder surface, wherein the first protruding portion has a first columnar portion and a plurality of first ribs formed on an outer peripheral surface of the first columnar portion so as to be spaced apart from each other in a circumferential direction of the first columnar portion, wherein the plate-like portion has a first through hole into which the first protruding portion is press-fitted, wherein the first through hole is defined by a first through hole forming portion formed in a cylindrical shape so as to project from the plate-like portion to a side opposite to the opposed surface, wherein the first through hole has an inner surface including: a first hole inclined inner surface that is inclined in a direction of reducing an inner diameter of the first through hole with respect to the opposed surface from the opposed surface toward an end portion of the first through hole forming portion; and a first hole cylindrical inner surface extending from the first hole inclined inner surface to the end portion of the first through hole forming portion with the inner diameter of the first through hole kept constant, and wherein the first protruding portion is press-fitted into the first through hole under a state in which the plurality of first ribs are in contact with the first hole cylindrical inner surface.

Advantageous Effects of Invention

The electric driving device and the electric power steering device according to this invention are easily manufactured, and enable suppression of generation of foreign matter at the time of manufacture.

DESCRIPTION OF EMBODIMENTS

Now, embodiments of this invention are described with reference to the drawings.

First Embodiment

Figure 1:
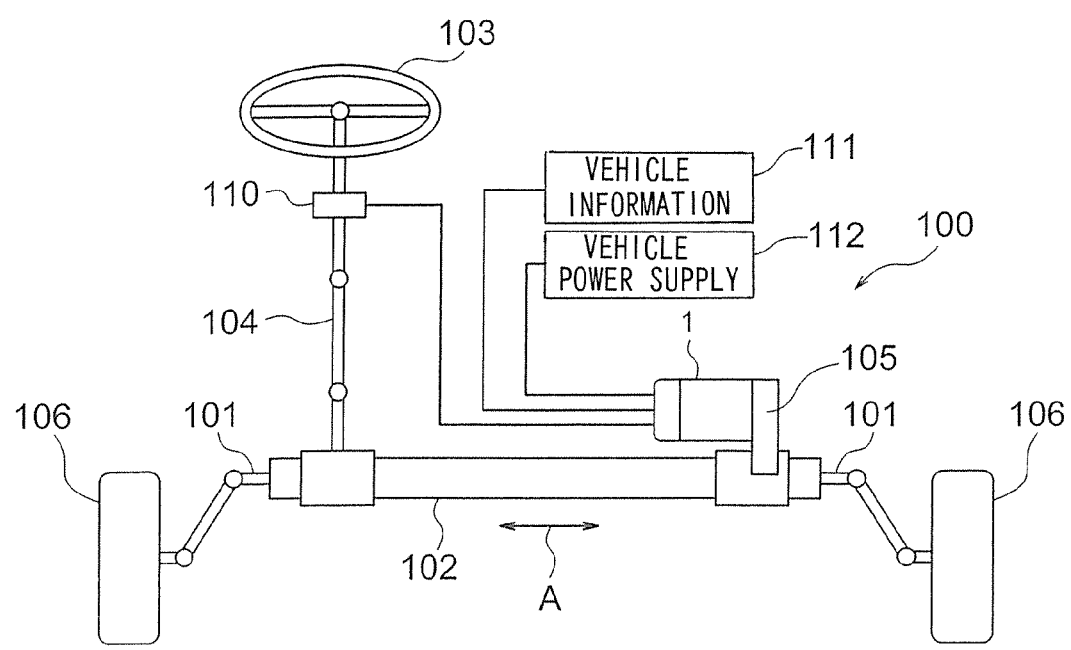
FIG. 1 is a configuration diagram for illustrating an electric power steering device according to a first embodiment of this invention.

FIG. 1 is a configuration diagram for illustrating an electric power steering device according to a first embodiment of this invention. An electric power steering device 100 according to this embodiment is, for example, a vehicle electric power steering device to be mounted in, for example, an automobile. The electric power steering device 100 includes a pair of tie rods 101, a rack shaft mechanism unit 102, a steering wheel 103, a steering shaft 104, a speed reducer 105, and an electric driving device 1.

The pair of tie rods 101 are individually coupled to a pair of steered wheels 106. The rack shaft mechanism unit 102 is arranged between the pair of tie rods 101. The rack shaft mechanism unit 102 includes a housing having a cylindrical shape and a rack shaft housed inside the housing. The rack shaft of the rack shaft mechanism unit 102 is coupled to each of the pair of tie rods 101.

The steering wheel 103 is coupled to the rack shaft mechanism unit 102 through intermediation of the steering shaft 104. When a driver steers the steering wheel 103, torque generated through steering is transmitted to the rack shaft of the rack shaft mechanism unit 102 via the steering shaft 104. Further, the electric driving device 1 is provided to the rack shaft mechanism unit 102 through intermediation of the speed reducer 105.

The electric driving device 1 is a torque generating device configured to generate an assist torque. The assist torque generated by the electric driving device 1 is increased by the speed reducer 105 and thereafter transmitted to the rack shaft of the rack shaft mechanism unit 102. The rack shaft of the rack shaft mechanism unit 102 is moved in directions indicated by an arrow A of FIG. 1 with the torque generated through the steering of the steering wheel 103 and the assist torque generated by the electric driving device 1. As a result, a driver's steering force is assisted by the assist torque generated by the electric driving device 1.

When the rack shaft is moved in the directions indicated by the arrow A, the pair of tie rods 101 are moved to steer the steered wheels 106 to thereby cause a vehicle to turn. As a result of assistance with the torque generated by the electric driving device 1 for the steering force, the driver can turn the vehicle with a smaller steering force.

A torque sensor 110 configured to detect the torque generated through the steering of the steering wheel 103 is provided to the steering shaft 104. Information of the torque detected by the torque sensor 110 is transmitted as an electric signal from the torque sensor 110 to the electric driving device 1. Further, vehicle information 111 including speed information of the vehicle is transmitted as an electric signal from a vehicle sensor installed in the vehicle to the electric driving device 1. Further, a vehicle power supply 112 installed in the vehicle is connected to the electric driving device 1. Examples of the vehicle power supply 112 include a battery and an alternator.

Figure 2:
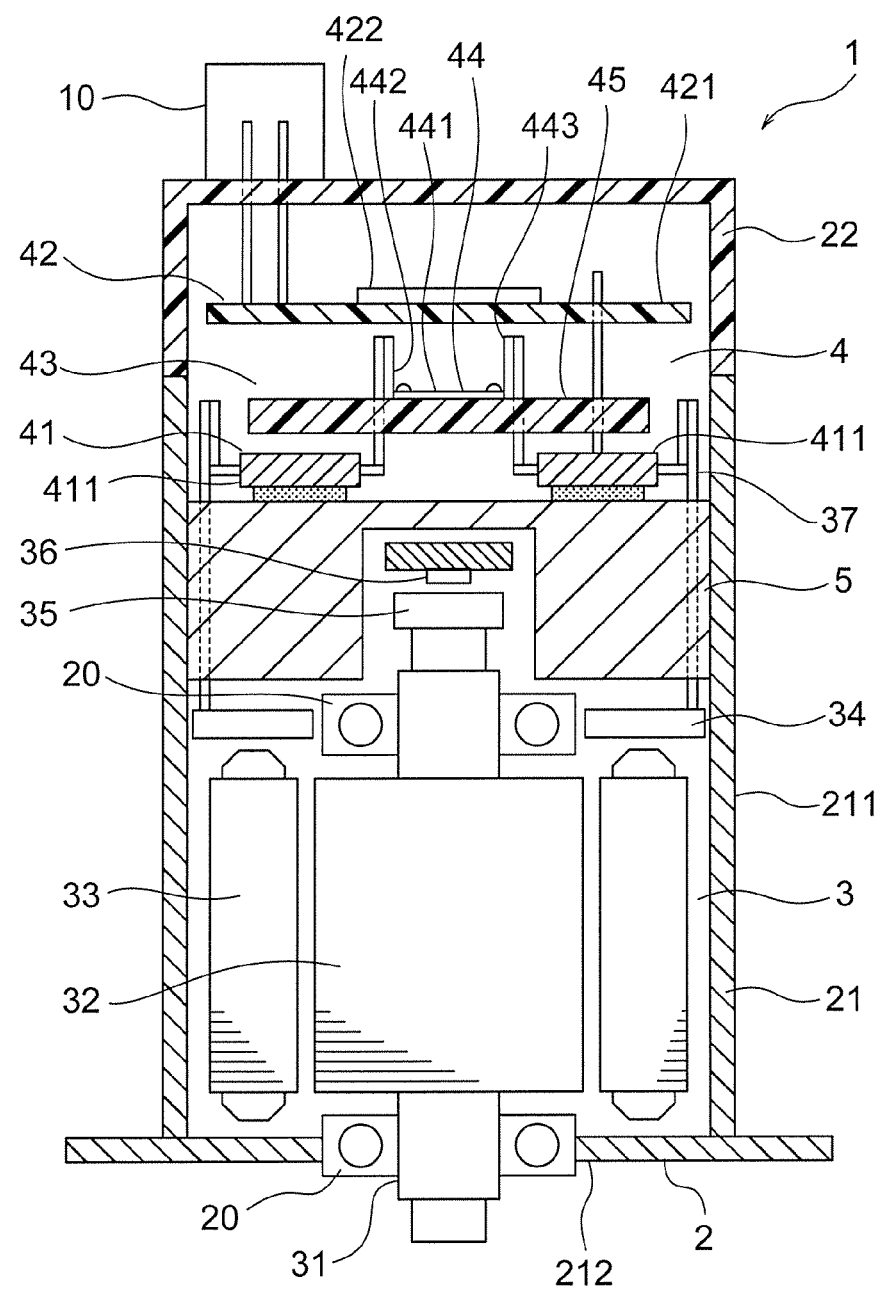
FIG. 2 is a sectional view for illustrating an electric driving device of FIG. 1.

FIG. 2 is a sectional view for illustrating the electric driving device 1 of FIG. 1. The electric driving device 1 includes a housing 2, a motor 3, a control unit 4, and a frame 5.

The housing 2 includes a case 21 made of a metal and a cover 22 made of a resin. The cover 22 is mounted to the case 21.

The case 21 includes a cylindrical portion 211 and an end wall portion 212. The cylindrical portion 211 has an axis. The end wall portion 212 closes one end portion of the cylindrical portion 211 in an axial direction. The axis of the cylindrical portion 211 matches an axis of the case 21. The case 21 has an opening portion formed at the other end portion of the cylindrical portion 211 in the axial direction. The cover 22 closes the opening portion of the case 21.

The motor 3, the control unit 4, and the frame 5 are housed in the housing 2. In this manner, the electric driving device 1 is formed as an integrated electric driving device in which the motor 3 and the control unit 4 are integrated with each other.

The motor 3 is housed in the case 21. The control unit 4 is arranged between the motor 3 and the cover 22. The frame 5 is arranged between the motor 3 and the control unit 4.

The frame 5 is made of a metal. The frame 5 has such a shape as to be fitted into an inner surface of the cylindrical portion 211. The frame 5 is mounted to the case 21 in a state of being in contact with the inner surface of the cylindrical portion 211. As a result, the frame 5 is electrically and thermally connected to the case 21.

The motor 3 includes an output shaft 31, a rotor 32, a stator 33, and a wire connection member 34. The output shaft 31 is arranged coaxially with the case 21. The rotor 32 is fixed to the output shaft 31. The stator 33 having a cylindrical shape surrounds an outer peripheral portion of the rotor 32. The wire connection member 34 having an annular shape is provided to the stator 33.

The output shaft 31 has a first end portion and a second end portion. A through hole is formed in a center of the end wall portion 212. The first end portion of the output shaft 31 is caused to pass through the through hole formed in the end wall portion 212 as an output portion of the electric driving device 1. A recess is formed in a center of the frame 5. The second end portion of the output shaft 31 is placed in the recess formed in the frame 5.

The output shaft 31 is rotatably supported by the case 21 and the frame 5 through intermediation of two bearings 20 that are individually mounted to the end wall portion 212 and the frame 5. The bearing 20, which is mounted to the end wall portion 212, is fitted into the through hole formed in the end wall portion 212.

The rotor 32 includes a rotor core and a plurality of permanent magnets. The rotor core is fixed to the output shaft 31. The plurality of permanent magnets are provided to the rotor core. The rotor 32 is rotated integrally with the output shaft 31 about an axis of the output shaft 31.

The stator 33 is fixed to the inner surface of the cylindrical portion 211. Further, the stator 33 is arranged coaxially with the output shaft 31. Still further, the stator 33 includes a stator core having a cylindrical shape and a three-phase stator winding provided to the stator core.

The wire connection member 34 is arranged between the stator 33 and the frame 5. The three-phase stator winding includes a plurality of winding portions. End portions of the plurality of winding portions are electrically connected to each other through the wire connection member 34. The plurality of winding portions are connected in a star connection or delta connection state through the wire connection member 34. This wire connection forms the three-phase stator winding. In this example, the motor 3 is formed as a three-phase brushless motor.

A sensor magnet 35 is fixed to the second end portion of the output shaft 31. The sensor magnet 35 rotates integrally with the output shaft 31. A rotation sensor 36 is provided in the recess formed in the frame 5. The rotation sensor 36 is opposed to the sensor magnet 35 in an axial direction of the output shaft 31. The rotation sensor 36 is configured to detect a magnetic field of the sensor magnet 35, which changes in accordance with the rotation of the output shaft 31. In this manner, the rotation sensor 36 generates rotation information in accordance with the rotation of the output shaft 31 as an electric signal.

A connector 10 is provided on an outer surface of the cover 22. The connector 10 includes a power connector portion and a signal connector portion. The vehicle power supply 112 is electrically connected to the power connector portion. The torque sensor 110 and the vehicle sensor are electrically connected to the signal connector portion.

A plurality of lead-out lines 37 configured to electrically connect the stator winding of the stator 33 to the control unit 4 are provided to the wire connection member 34. The lead-out lines 37 pass through the frame 5.

The control unit 4 includes an inverter circuit 41 and a control board 42. The inverter circuit 41 is arranged at a position closer to the frame 5 than the control board 42. The control board 42 and the inverter circuit 41 are electrically connected to the connector 10.

Power is fed to the inverter circuit 41 from the vehicle power supply 112 via the power connector portion of the connector 10. The inverter circuit 41 includes a plurality of power modules 411 and a bus bar unit 43.

The bus bar unit 43 is arranged between the plurality of power modules 411 and the control board 42. Further, the bus bar unit 43 includes a bus bar 44 and a holder 45 having a plate-like shape. The holder 45 is configured to hold the bus bar 44. The holder 45 is supported by the frame 5. The bus bar 44 electrically connects the plurality of power modules 411 to each other. Further, the bus bar 44 electrically connects the plurality of power modules 411 to the connector 10.

Each of the power modules 411 is a heat generating component including a switching element. The lead-out lines 37 are connected to connection terminals of the power modules 411, respectively. The inverter circuit 41 controls the switching elements of the plurality of power modules 411 so that the switching elements are individually operated to thereby supply a current to the motor 3 via the lead-out lines 37.

The power modules 411 are held in close contact with the frame 5 through intermediation of a paste-like thermally conductive member. Heat generated by the power modules 411 is dissipated to an outside of the housing 2 through the frame 5 and the case 21. Thus, the frame 5 has a function as a heat sink configured to dissipate heat generated by the inverter circuit 41 to the outside of the housing 2.

The control board 42 includes a board 421 made of a resin and a central processing unit (CPU) 422 mounted on the board 421.

The information of the torque from the torque sensor 110, the vehicle information 111 from the vehicle sensor, and the rotation information from the rotation sensor 36 are transmitted to the control board 42. The control board 42 computes an assist torque based on the information of the torque from the torque sensor 110, the vehicle information 111 from the vehicle sensor, and the rotation information from the rotation sensor 36. Further, the control board 42 individually controls operations of the plurality of switching elements in accordance with the computed assist torque. As a result, a current in accordance with the assist torque is fed from the inverter circuit 41 to the stator 33. The rotor 32 is rotated integrally with the output shaft 31 by supply of the current to the stator 33.

Figure 3:
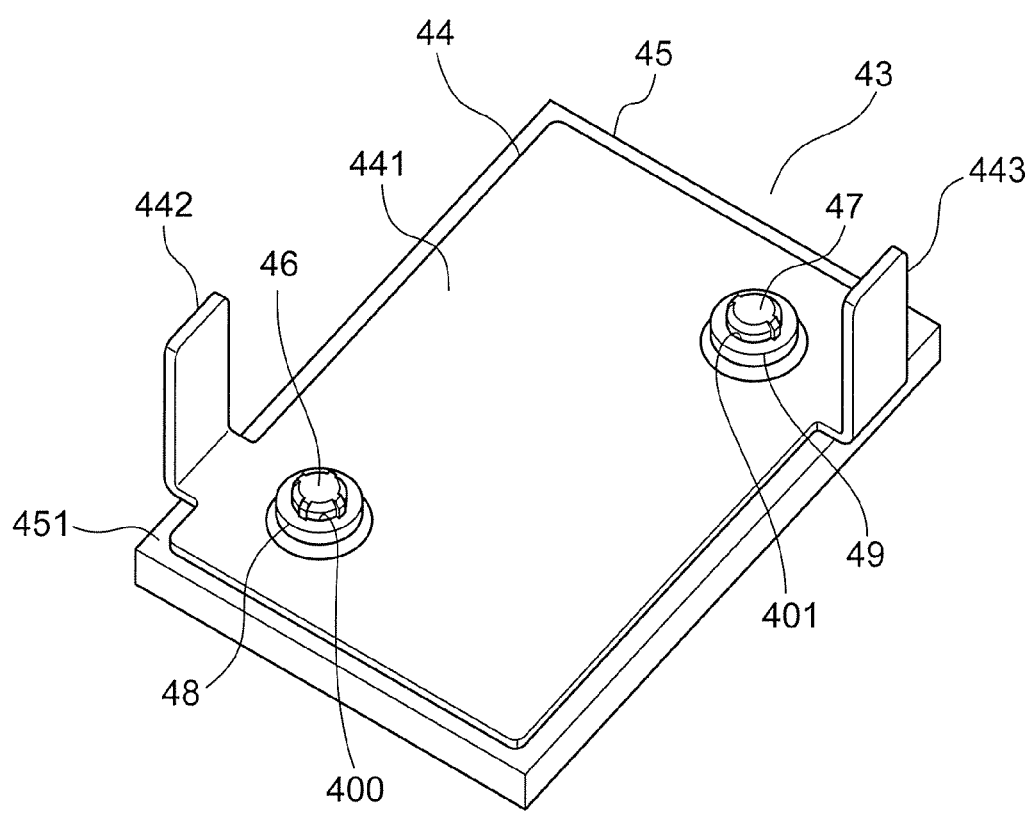
FIG. 3 is a perspective view for illustrating a bus bar unit of FIG. 2.

FIG. 3 is a perspective view for illustrating the bus bar unit 43 of FIG. 2. The holder 45 has a holder surface 451 orthogonal to a thickness direction of the holder 45. The holder 45 is arranged with the holder surface 451 facing the control board 42. Further, the holder 45 is made of a resin having an electrical insulating property.

The bus bar 44 is arranged on the holder surface 451 of the holder 45. Further, the bus bar 44 includes a plate-like portion 441, a first terminal 442, and a second terminal 443. The plate-like portion 441 is placed on the holder surface 451 in an overlapping manner. The first terminal 442 and the second terminal 443 project from the plate-like portion 441 as a plurality of terminals. The bus bar 44 is made of a material having electroconductivity. In this example, the bus bar 44 is made of copper.

The plate-like portion 441 is a band-shaped plate. The first terminal 442 and the second terminal 443 project from the plate-like portion 441 to a side opposite to the holder 45. In this example, the first terminal 442 projects from one end portion of both end portions of the plate-like portion 441 in a width direction of the plate-like portion 441, and the second terminal 443 projects from the other end portion of the end portions. Positions of the first terminal 442 and the second terminal 443 in a longitudinal direction of the plate-like portion 441 are different from each other.

As illustrated in FIG. 2, any ones of the connection terminals of the plurality of power modules 411 are selectively connected to the first terminal 442 and the second terminal 443, respectively.

The holder 45 has a first protruding portion 46 and a second protruding portion 47 that project from the holder surface 451. The first protruding portion 46 and the second protruding portion 47 are formed at different positions on the holder surface 451. Each of the first protruding portion 46 and the second protruding portion 47 is made of a resin having an electrical insulating property. Each of lengths of the first terminal 442 and the second terminal 443 is larger than each of height dimensions of the first protruding portion 46 and the second protruding portion 47 from the holder surface 451.

The plate-like portion 441 has a first through hole 400 and a second through hole 401. The first protruding portion 46 is press-fitted into the first through hole 400. The second protruding portion 47 is press-fitted into the second through hole 401. The bus bar 44 is held on the holder 45 by press-fitting the first protruding portion 46 into the first through hole 400 and press-fitting the second protruding portion 47 into the second through hole 401. Each of the first through hole 400 and the second through hole 401 has an axis extending along a thickness direction of the plate-like portion 441.

A position of the first through hole 400 formed in the plate-like portion 441 is closer to the first terminal 442 than to a middle position of the plate-like portion 441 in the width direction. Further, the position of the first through hole 400 formed in the plate-like portion 441 matches a position of the first terminal 442 in the longitudinal direction of the plate-like portion 441. A distance from the first through hole 400 to the first terminal 442 is smaller than a distance from the first through hole 400 to the second terminal 443.

A position of the second through hole 401 formed in the plate-like portion 441 is closer to the second terminal 443 than to a middle position of the plate-like portion 441 in the width direction. Further, the position of the second through hole 401 formed in the plate-like portion 441 matches a position of the second terminal 443 in the longitudinal direction of the plate-like portion 441. A distance from the second through hole 401 to the second terminal 443 is smaller than a distance from the second through hole 401 to the first terminal 442.

Thus, a straight line that connects the first through hole 400 and the second through hole 401 is inclined with respect to the longitudinal direction of the plate-like portion 441.

Figure 4:
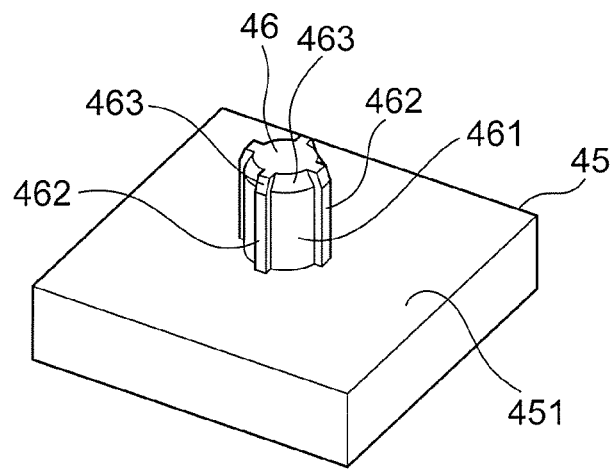
FIG. 4 is a perspective view for illustrating a first protruding portion of FIG. 3.

FIG. 4 is a perspective view for illustrating the first protruding portion 46 of FIG. 3. The first protruding portion 46 has a first columnar portion 461 and a plurality of first ribs 462. The first columnar portion 461 projects from the holder surface 451. The plurality of first ribs 462 are formed on an outer peripheral surface of the first columnar portion 461.

The first columnar portion 461 has a columnar shape. A center axis of the first columnar portion 461 is orthogonal to the holder surface 451. An outer diameter of the first columnar portion 461 is smaller than an inner diameter of the first through hole 400. A height dimension of the first columnar portion 461 from the holder surface 451 is larger than a thickness of the plate-like portion 441.

The plurality of first ribs 462 are formed so as to be spaced apart from each other in a circumferential direction of the first columnar portion 461. In this example, the plurality of first ribs 462 are formed at equal intervals in the circumferential direction of the first columnar portion 461. Further, in this example, four first ribs 462 are formed on the outer peripheral surface of the first columnar portion 461.

Each of the first ribs 462 projects radially outward from the outer peripheral surface of the first columnar portion 461. Further, each of the first ribs 462 is formed along a height direction of the first columnar portion 461. Each of the first ribs 462 is formed to extend over the entire length in the height direction of the first columnar portion 461. First tapered surfaces 463, each being inclined in a direction of approaching the center axis of the first protruding portion 46 toward an end surface of the first protruding portion 46, are formed at an end portion of the first protruding portion 46.

Figure 5:
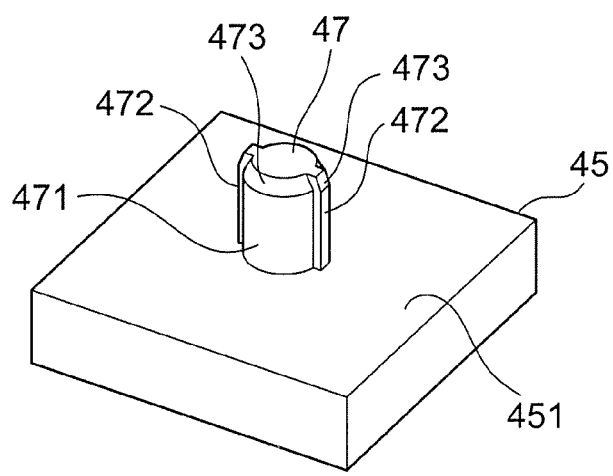
FIG. 5 is a perspective view for illustrating a second protruding portion of FIG. 3.

FIG. 5 is a perspective view for illustrating the second protruding portion 47 of FIG. 3. The second protruding portion 47 has a second columnar portion 471 and a plurality of second ribs 472. The second columnar portion 471 projects from the holder surface 451. The plurality of second ribs 472 are formed on an outer peripheral surface of the second columnar portion 471.

The second columnar portion 471 has a columnar shape. A center axis of the second columnar portion 471 is orthogonal to the holder surface 451. An outer diameter of the second columnar portion 471 is smaller than an inner diameter of the second through hole 401. A height dimension of the second columnar portion 471 from the holder surface 451 is larger than the thickness of the plate-like portion 441.

The plurality of second ribs 472 are formed so as to be spaced apart from each other in a circumferential direction of the second columnar portion 471. In this example, the plurality of second ribs 472 are formed at equal intervals in the circumferential direction of the second columnar portion 471. Further, the number of second ribs 472 formed on the outer peripheral surface of the second columnar portion 471 is smaller than the number of first ribs 462 formed on the outer peripheral surface of the first columnar portion 461. In this example, two second ribs 472 are formed on the outer peripheral surface of the second columnar portion 471.

Each of the second ribs 472 projects radially outward from the outer peripheral surface of the second columnar portion 471. Further, each of the second ribs 472 is formed along a height direction of the second columnar portion 471. Each of the second ribs 472 is formed to extend over the entire length in the height direction of the second columnar portion 471. Second tapered surfaces 473, each being inclined in a direction of approaching the center axis of the second protruding portion 47 toward an end surface of the second protruding portion 47, are formed at an end portion of the second protruding portion 47.

Figure 6:
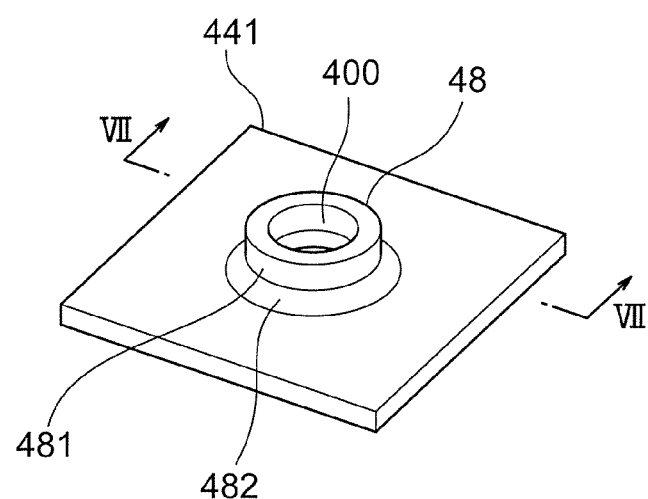
FIG. 6 is a perspective view for illustrating a first through hole formed in a plate-like portion of FIG. 3.
Figure 7:
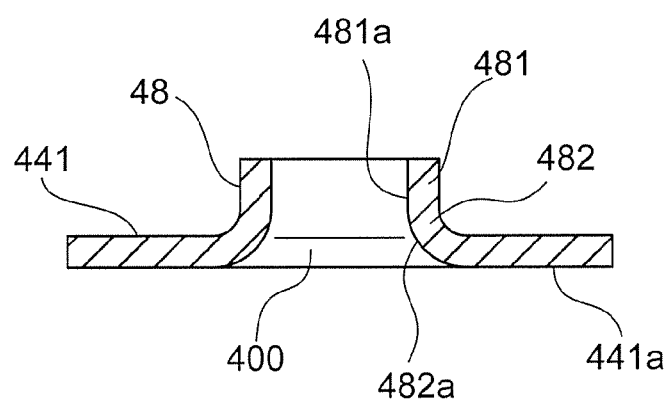
FIG. 7 is a sectional view taken along the line VII-VII of FIG. 6.

FIG. 6 is a perspective view for illustrating the first through hole 400 formed in the plate-like portion 441 of FIG. 3. Further, FIG. 7 is a sectional view taken along the line VII-VII of FIG. 6. As illustrated in FIG. 7, the plate-like portion 441 has an opposed surface 441a to be opposed to the holder surface 451. The first through hole 400 is defined by a first through hole forming portion 48 of the plate-like portion 441, which is formed in a cylindrical shape. Thus, an inner surface of the first through hole forming portion 48 serves as an inner surface of the first through hole 400. The first through hole forming portion 48 projects from the plate-like portion 441 to a side opposite to the opposed surface 441a. The first through hole 400 has a circular sectional shape.

The first through hole forming portion 48 has a first cylindrical portion 481 and a first annular portion 482. The first annular portion 482 connects the first cylindrical portion 481 to the plate-like portion 441. The first cylindrical portion 481 has a circular cylindrical shape.

The inner surface of the first through hole 400 includes a first hole cylindrical inner surface 481a and a first hole inclined inner surface 482a. The first hole cylindrical inner surface 481a corresponds to an inner surface of the first cylindrical portion 481. The first hole inclined inner surface 482a corresponds to an inner surface of the first annular portion 482.

The first hole inclined inner surface 482a is inclined with respect to the opposed surface 441a. Further, the first hole inclined inner surface 482a is inclined in a direction of reducing an inner diameter of the first through hole 400 from the opposed surface 441a toward an end portion of the first through hole forming portion 48. The first hole cylindrical inner surface 481a extends from the first hole inclined inner surface 482a to the end portion of the first through hole forming portion 48 with the inner diameter of the first through hole 400 kept constant.

The first hole inclined inner surface 482a is a curved surface that protrudes to an inner side of the first through hole 400. Thus, the first hole inclined inner surface 482a is seen as a curved line that is inclined with respect to the opposed surface 441a in a cross section of the first through hole forming portion 48, which is taken along a plane containing an axis of the first through hole 400. Further, the first hole inclined inner surface 482a is smoothly continuous with the opposed surface 441a and the first hole cylindrical inner surface 481a.

The first hole cylindrical inner surface 481a is a circular cylindrical surface. Further, a dimension of the first hole cylindrical inner surface 481a in an axial direction of the first through hole 400 is larger than the thickness of the plate-like portion 441.

Figure 8:
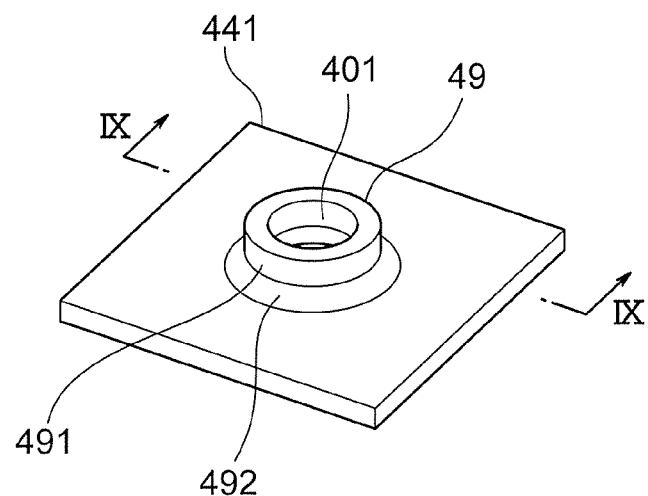
FIG. 8 is a perspective view for illustrating a second through hole formed in the plate-like portion of FIG. 3.
Figure 9:
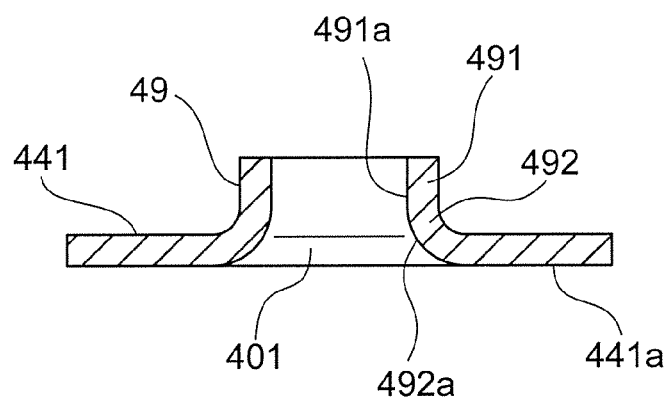
FIG. 9 is a sectional view taken along the line IX-IX of FIG. 8.

FIG. 8 is a perspective view for illustrating the second through hole 401 formed in the plate-like portion 441 of FIG. 3. Further, FIG. 9 is a sectional view taken along the line IX-IX of FIG. 8. The second through hole 401 is defined by a second through hole forming portion 49 of the plate-like portion 441, which is formed in a cylindrical shape. Thus, an inner surface of the second through hole forming portion 49 serves as an inner surface of the second through hole 401. The second through hole forming portion 49 projects from the plate-like portion 441 to a side opposite to the opposed surface 441a. The second through hole 401 has a circular sectional shape.

The second through hole forming portion 49 has a second cylindrical portion 491 and a second annular portion 492. The second annular portion 492 connects the second cylindrical portion 491 to the plate-like portion 441. The second cylindrical portion 491 has a circular cylindrical shape.

The inner surface of the second through hole 401 includes a second hole cylindrical inner surface 491a and a second hole inclined inner surface 492a. The second hole cylindrical inner surface 491a corresponds to an inner surface of the second cylindrical portion 491. The second hole inclined inner surface 492a corresponds to an inner surface of the second annular portion 492.

The second hole inclined inner surface 492a is inclined with respect to the opposed surface 441a. Further, the second hole inclined inner surface 492a is inclined in a direction of reducing an inner diameter of the second through hole 401 from the opposed surface 441a toward an end portion of the second through hole forming portion 49. The second hole cylindrical inner surface 491a extends from the second hole inclined inner surface 492a to the end portion of the second through hole forming portion 49 with the inner diameter of the second through hole 401 kept constant.

The second hole inclined inner surface 492a is a curved surface that protrudes to an inner side of the second through hole 401. Thus, the second hole inclined inner surface 492a is seen as a curved line that is inclined with respect to the opposed surface 441a in a cross section of the second through hole forming portion 49, which is taken along a plane containing an axis of the second through hole 401.

Further, the second hole inclined inner surface 492a is smoothly continuous with the opposed surface 441a and the second hole cylindrical inner surface 491a.

The second hole cylindrical inner surface 491a is a circular cylindrical surface. Further, a dimension of the second hole cylindrical inner surface 491a in an axial direction of the second through hole 401 is larger than the thickness of the plate-like portion 441.

Figure 10:
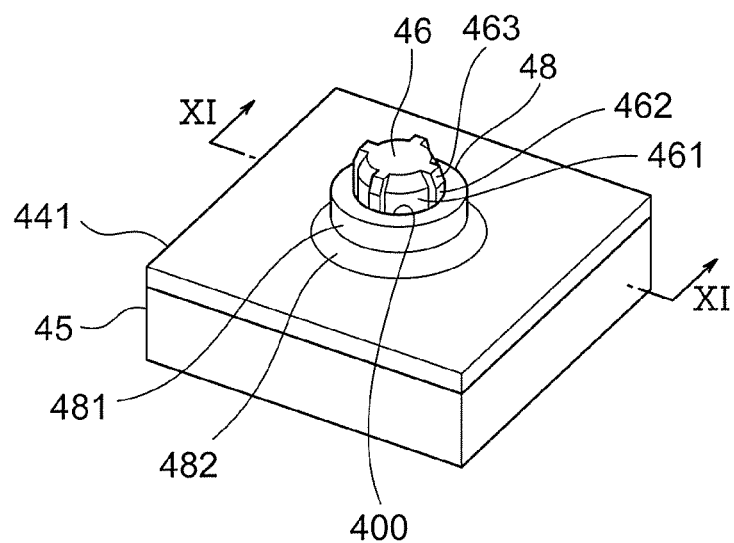
FIG. 10 is a perspective view for illustrating a state in which the first protruding portion of FIG. 4 is press-fitted into the first through hole of the plate-like portion.
Figure 11:
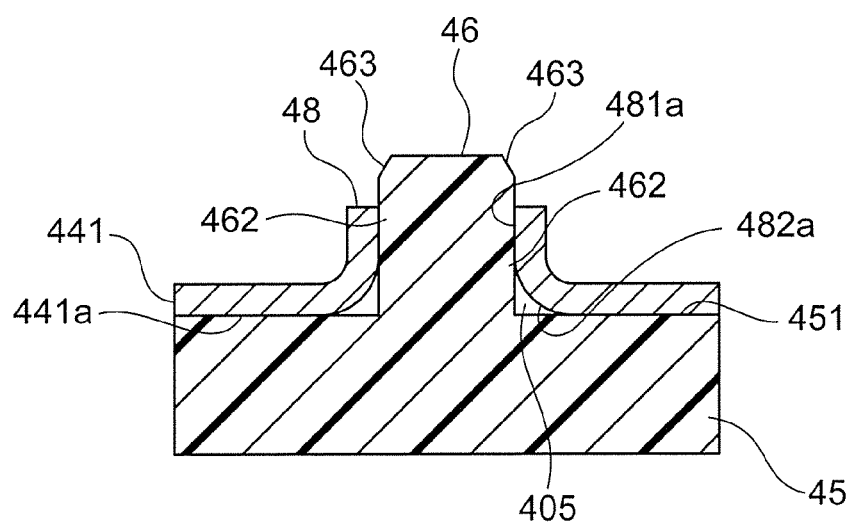
FIG. 11 is a sectional view taken along the line XI-XI of FIG. 10.

FIG. 10 is a perspective view for illustrating a state in which the first protruding portion 46 of FIG. 4 is press-fitted into the first through hole 400 of the plate-like portion 441. Further, FIG. 11 is a sectional view taken along the line XI-XI of FIG. 10. The plate-like portion 441 is placed on the holder surface 451 in an overlapping manner with the opposed surface 441a opposed to the holder surface 451. The first protruding portion 46 is press-fitted into the first through hole 400 under a state in which the first ribs 462 are in contact with the first hole cylindrical inner surface 481a. As a result, the first protruding portion 46 is tightened by the first hole cylindrical inner surface 481a.

Gaps are defined between the outer peripheral surface of the first columnar portion 461 and the first hole cylindrical inner surface 481a under a state in which the first protruding portion 46 is press-fitted into the first through hole 400. Each of the gaps defined between the outer peripheral surface of the first columnar portion 461 and the first hole cylindrical inner surface 481a has such a dimension as to inhibit passage of foreign matter having a size larger than a reference size allowed to enter the control unit 4. Further, the end portion of the first protruding portion 46 projects beyond the first through hole forming portion 48 under a state in which the first protruding portion 46 is press-fitted into the first through hole 400. The first protruding portion 46 is press-fitted into the first through hole 400 from the opposed surface 441a side of the plate-like portion 441.

A first space portion 405 in which the plurality of first ribs 462 are exposed is defined between the first hole inclined inner surface 482a and the holder 45. In this example, the first space portion 405 is defined between the first hole inclined inner surface 482a and the holder 45 around the entire circumference of the first protruding portion 46. Not only the first ribs 462 but also the outer peripheral surface of the first columnar portion 461 is exposed in the first space portion 405.

Figure 12:
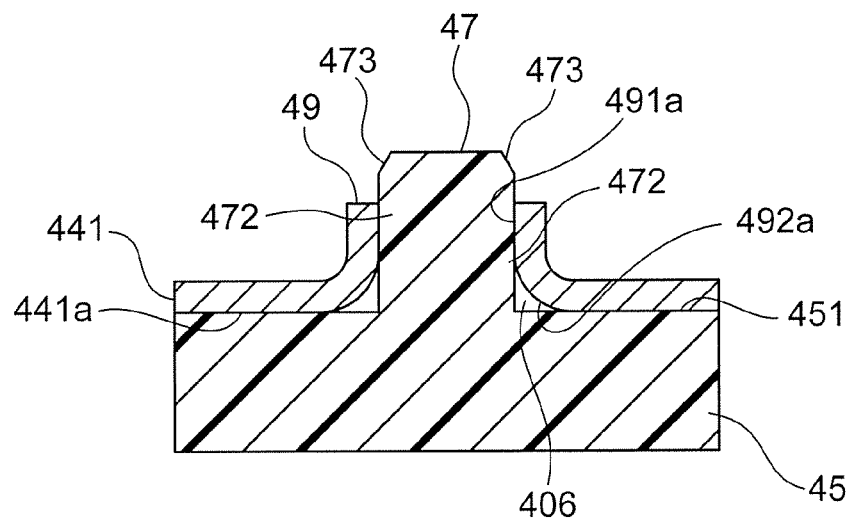
FIG. 12 is a sectional view for illustrating a state in which the second protruding portion of FIG. 5 is press-fitted into the second through hole of the plate-like portion.

FIG. 12 is a sectional view for illustrating a state in which the second protruding portion 47 of FIG. 5 is press-fitted into the second through hole 401 of the plate-like portion 441. The second protruding portion 47 is press-fitted into the second through hole 401 under a state in which the second ribs 472 are in contact with the second hole cylindrical inner surface 491a. As a result, the second protruding portion 47 is tightened by the second hole cylindrical inner surface 491a.

Gaps are defined between the outer peripheral surface of the second columnar portion 471 and the second hole cylindrical inner surface 491a under a state in which the second protruding portion 47 is press-fitted into the second through hole 401. Each of the gaps defined between the outer peripheral surface of the second columnar portion 471 and the second hole cylindrical inner surface 491a has such a dimension as to inhibit passage of foreign matter having a size larger than a set allowable size allowed to enter the control unit 4. Further, the end portion of the second protruding portion 47 projects beyond the second through hole forming portion 49 under a state in which the second protruding portion 47 is press-fitted into the second through hole 401. The second protruding portion 47 is press-fitted into the second through hole 401 from the opposed surface 441a side of the plate-like portion 441.

A second space portion 406 in which the plurality of second ribs 472 are exposed is defined between the second hole inclined inner surface 492a and the holder 45. In this example, the second space portion 406 is defined between the second hole inclined inner surface 492a and the holder 45 around the entire circumference of the second protruding portion 47. Not only the second ribs 472 but also the outer peripheral surface of the second columnar portion 471 is exposed in the second space portion 406.

In the electric driving device 1 described above, the inner surface of the first through hole 400 includes the first hole inclined inner surface 482a and the first hole cylindrical inner surface 481a. Further, the first protruding portion 46 is press-fitted into the first through hole 400 under a state in which the plurality of first ribs 462 are in contact with the first hole cylindrical inner surface 481a. Thus, when the first protruding portion 46 is press-fitted into the first through hole 400, the first protruding portion 46 can easily be guided to the first hole cylindrical inner surface 481a along the first hole inclined inner surface 482a. As a result, the first protruding portion 46 can easily be press-fitted into the first through hole 400. Thus, the plate-like portion 441 can easily be positioned with respect to the holder 45.

Further, with the first through hole forming portion 48 projecting from the plate-like portion 441, the dimension of the first hole cylindrical inner surface 481a in the thickness direction of the plate-like portion 441 can be ensured. As a result, a contact area of each of the first ribs 462 with the first hole cylindrical inner surface 481a can easily be ensured, and the first protruding portion 46 can be prevented from easily being disengaged from the first through hole 400. Thus, the first protruding portion 46 is not required to be welded to the plate-like portion 441. As a result, a burden of welding work can be eliminated. Based on the arrangement and the structure described above, work of placing the bus bar 44 to be held on the holder 45 can easily be performed, and thus the electric driving device 1 and the electric power steering device 100 can easily be manufactured. As a result, reduction in costs of the electric driving device 1 and the electric power steering device 100 can be achieved.

Further, the first hole inclined inner surface 482a is located between the first hole cylindrical inner surface 481a and the opposed surface 441a. Thus, an inner diameter of an opening portion of the first through hole 400 formed in the opposed surface 441a can be set larger than an inner diameter of the first hole cylindrical inner surface 481a. With this setting, when the first protruding portion 46 is press-fitted into the first through hole 400, the first protruding portion 46 can be made less liable to be brought into contact with an edge of the opening portion of the first through hole 400. Further, an angle of the first hole inclined inner surface 482a with respect to the first hole cylindrical inner surface 481a can be obtuse. Thus, the first ribs 462 can be made less liable to be scraped at a boundary between the first hole cylindrical inner surface 481a and the first hole inclined inner surface 482a. Thus, when the first protruding portion 46 is press-fitted into the first through hole 400, generation of shavings of the first protruding portion 46 as foreign matter can be suppressed. As a result, generation of foreign matter at the time of manufacture of the electric driving device 1 and the electric power steering device 100 can be suppressed.

When foreign matter is generated at the time of press-fitting of the first protruding portion 46 into the first through hole 400, the foreign matter may intrude into a space between the plate-like portion 441 and the holder surface 451. As a result, insertion of the first protruding portion 46 into the first through hole 400 may be incomplete, and the bus bar 44 is more liable to be disengaged from the holder 45. Further, the positioning accuracy of the bus bar 44 with respect to the holder 45 may decrease.

In this embodiment, the generation of foreign matter at the time of manufacture of the electric driving device 1 and the electric power steering device 100 can be suppressed. Thus, the bus bar 44 can be more reliably held on the holder 45, and decrease in the positioning accuracy of the bus bar 44 with respect to the holder 45 can be suppressed.

Further, the first space portion 405 in which the plurality of first ribs 462 are exposed is defined between the first hole inclined inner surface 482a and the holder 45. Thus, even when the first ribs 462 are scraped to generate foreign matter at the time of press-fitting of the first protruding portion 46 into the first through hole 400, the foreign matter can be received in the first space portion 405. As a result, the intrusion of foreign matter into the space between the plate-like portion 441 and the holder surface 451 can be more reliably prevented. Thus, the bus bar 44 can be more reliably held on the holder 45, and decrease in the positioning accuracy of the bus bar 44 with respect to the holder 45 can be more reliably suppressed.

Further, the dimension of the first hole cylindrical inner surface 481a in the axial direction of the first through hole 400 is larger than the thickness of the plate-like portion 441. Thus, increase in contact area of each of the first ribs 462 with the first hole cylindrical inner surface 481a can be more reliably achieved. As a result, disengagement of the first protruding portion 46 from the first through hole 400 can be more reliably prevented, and a state in which the bus bar 44 is held on the holder 45 can be more reliably maintained.

Further, the bus bar 44 has the first terminal 442 projecting from the plate-like portion 441 to the side opposite to the holder 45. In a case in which the first protruding portion 46 is welded to the plate-like portion 441 with use of a welding tool, the welding tool may interfere with the first terminal 442. Thus, a space in which the welding tool is arranged is required to be secured around the first protruding portion 46 and the first through hole 400. In this case, a position of the first through hole 400 is required to be separated from the first terminal 442 to a position at which the first terminal 442 does not interfere with the welding tool. Thus, the bus bar unit 43 is disadvantageously increased in size.

Meanwhile, in this embodiment, the need of use of the welding tool configured to weld the first protruding portion 46 to the plate-like portion 441 is eliminated. Thus, even when the first terminal 442 projects from the plate-like portion 441 to the side opposite to the holder 45, the first through hole 400 can be formed at a position closer to the first terminal 442. Thus, increase in size of the bus bar unit 43 can be suppressed.

Further, similarly to the first terminal 442, the second through hole 401 can also be formed at a position closer to the second terminal 443. As a result, the suppression of increase in size of the bus bar unit 43 can be more reliably achieved.

Further, the inner surface of the second through hole 401 includes the second hole inclined inner surface 492a and the second hole cylindrical inner surface 491a. Still further, the second protruding portion 47 is press-fitted into the second through hole 401 under a state in which the plurality of second ribs 472 are in contact with the second hole cylindrical inner surface 491a. Thus, the second protruding portion 47 can easily be press-fitted into the second through hole 401. Further, when the second protruding portion 47 is press-fitted into the second through hole 401, generation of shavings of the second protruding portion 47 as foreign matter can be suppressed. Thus, the generation of foreign matter at the time of manufacture of the electric driving device 1 and the electric power steering device 100 can be suppressed. Further, the plate-like portion 441 can be retained on the holder 45 at the positions of the first protruding portion 46 and the second protruding portion 47. As a result, a state in which the bus bar 44 is held on the holder 45 can be more reliably maintained.

The number of second ribs 472 of the second protruding portion 47 is smaller than the number of first ribs 462 of the first protruding portion 46. Thus, even when the second protruding portion 47 is misaligned in position with respect to the second through hole 401, the second protruding portion 47 can more easily be press-fitted into the second through hole 401. Thus, even when the position of the second protruding portion 47 is misaligned with respect to the position of the second through hole 401 at the time of press-fitting of the first protruding portion 46 into the first through hole 400, the second protruding portion 47 can be more reliably press-fitted into the second through hole 401. In this manner, inclination of the plate-like portion 441 with respect to the holder surface 451 can be suppressed.

Further, the first protruding portion 46 has four first ribs 462. The second protruding portion 47 has two second ribs 472. Thus, when the first protruding portion 46 is press-fitted into the first through hole 400, the plate-like portion 441 can be more precisely positioned with respect to the holder 45. Further, when the position of the second protruding portion 47 is misaligned with respect to the position of the second through hole 401 at the time of press-fitting of the first protruding portion 46 into the first through hole 400, the second protruding portion 47 can be press-fitted into the second through hole 401. As a result, the inclination of the plate-like portion 441 with respect to the holder surface 451 can be suppressed.

Further, the straight line that connects the first through hole 400 and the second through hole 401 is inclined with respect to the longitudinal direction of the plate-like portion 441. Thus, in comparison to a case in which the first through hole 400 and the second through hole 401 are located on a straight line extending along the longitudinal direction of the plate-like portion 441, a distance between the first through hole 400 and the second through hole 401 can be increased. As a result, the bus bar 44 can be more stably held on the holder 45, and the positioning accuracy of the bus bar 44 with respect to the holder 45 can be improved.

In the example described above, the first protruding portion 46 has four first ribs 462. However, the first protruding portion 46 may have two, three, or five or more first ribs 462.

Further, in the example described above, the second protruding portion 47 has two second ribs 472. However, the second protruding portion 47 may have three or more second ribs 472.

Still further, in the example described above, two protruding portions, that is, the first protruding portion 46 and the second protruding portion 47 are formed on the holder 45. However, three or more protruding portions may be formed on the holder 45 by forming one or more additional protruding portions, which are different from the first protruding portion 46 and the second protruding portion 47. In this case, the plate-like portion 441 has one or more additional through holes corresponding to the additional protruding portions. Specifically, the plate-like portion 441 has three or more through holes. Further, in this case, the additional protruding portion is press-fitted into the additional through hole. The additional protruding portion has the same configuration as the first protruding portion 46 except for the number of ribs. The additional protruding portion has a smaller number of ribs than the number of first ribs 462. The additional through hole has the same configuration as the first through hole 400.

Still further, in the example described above, the straight line that connects the first through hole 400 and the second through hole 401 is inclined with respect to the longitudinal direction of the plate-like portion 441. However, the positions of the first through hole 400 and the second through hole 401 in the plate-like portion 441 are not limited to the above-mentioned positions. For example, the first through hole 400 and the second through hole 401 may be located on a straight line extending along the longitudinal direction of the plate-like portion 441. Even in this manner, the bus bar 44 can be held on the holder 45.

Still further, the positions of the first through hole 400 and the second through hole 401 may be set regardless of the positions of the first terminal 442 and the second terminal 443.

Second Embodiment

Figure 13:
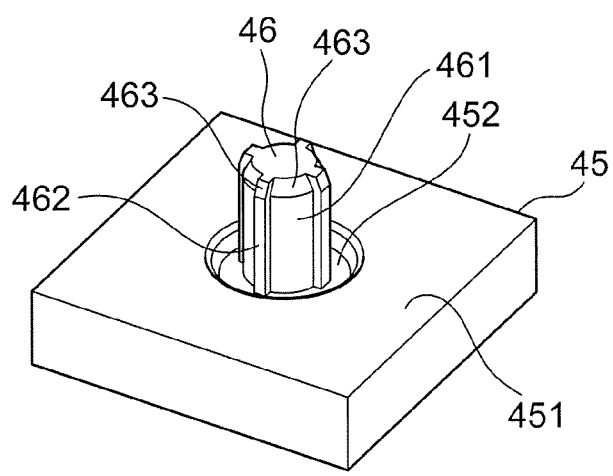
FIG. 13 is a perspective view for illustrating a first protruding portion of an electric driving device according to a second embodiment of this invention.

FIG. 13 is a perspective view for illustrating a first protruding portion 46 of an electric driving device 1 according to a second embodiment of this invention. A first recessed portion 452 that surrounds the first protruding portion 46 is formed in a holder surface 451 of a holder 45. The first recessed portion 452 is formed in the holder surface 451 around the entire circumference of the first protruding portion 46.

Figure 14:
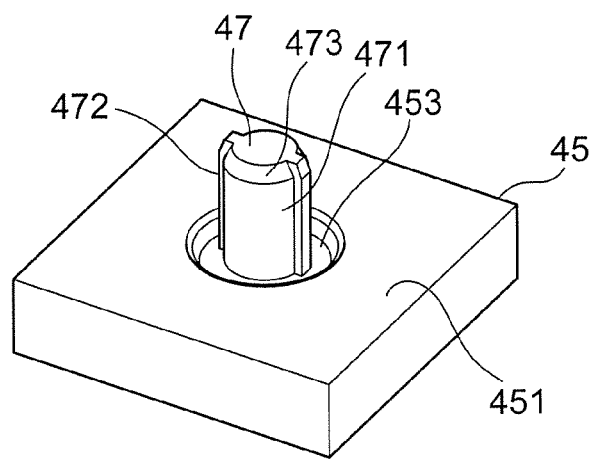
FIG. 14 is a perspective view for illustrating a second protruding portion of the electric driving device according to the second embodiment of this invention.

FIG. 14 is a perspective view for illustrating a second protruding portion 47 of the electric driving device 1 according to the second embodiment of this invention. A second recessed portion 453 that surrounds the second protruding portion 47 is formed in the holder surface 451 of the holder 45. The second recessed portion 453 is formed in the holder surface 451 around the entire circumference of the second protruding portion 47.

Figure 15:
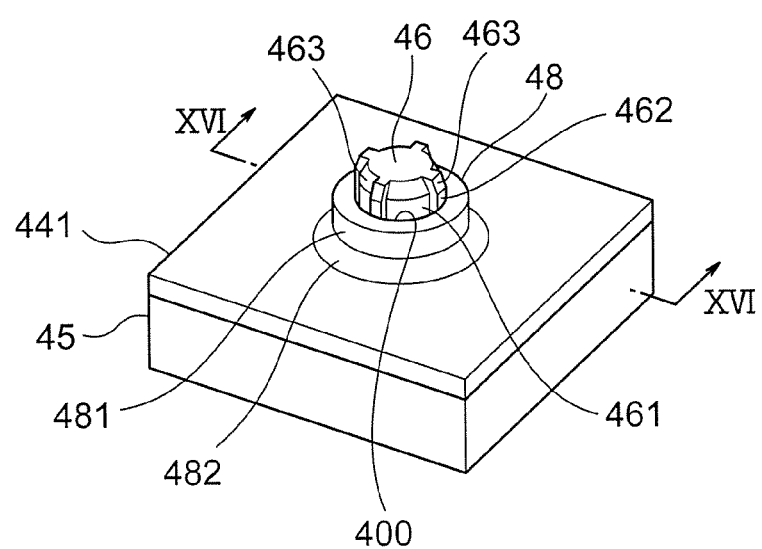
FIG. 15 is a perspective view for illustrating a state in which the first protruding portion of FIG. 13 is press-fitted into a first through hole of a plate-like portion.
Figure 16:
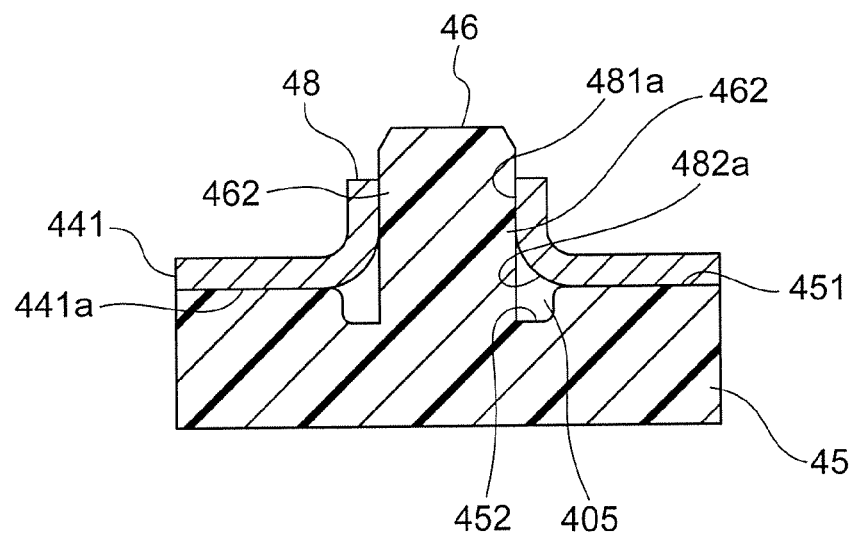
FIG. 16 is a sectional view taken along the line XVI-XVI of FIG. 15.

FIG. 15 is a perspective view for illustrating a state in which the first protruding portion 46 of FIG. 13 is press-fitted into a first through hole 400 of a plate-like portion 441. Further, FIG. 16 is a sectional view taken along the line XVI-XVI of FIG. 15. As illustrated in FIG. 16, a first space portion 405 in which a plurality of first ribs 462 are exposed is defined between an inner surface of the first recessed portion 452 and a first hole inclined inner surface 482*a* under a state in which the first protruding portion 46 is press-fitted into the first through hole 400. The first space portion 405 is defined between the first hole inclined inner surface 482*a* and the holder 45 around the entire circumference of the first protruding portion 46.

Figure 17:
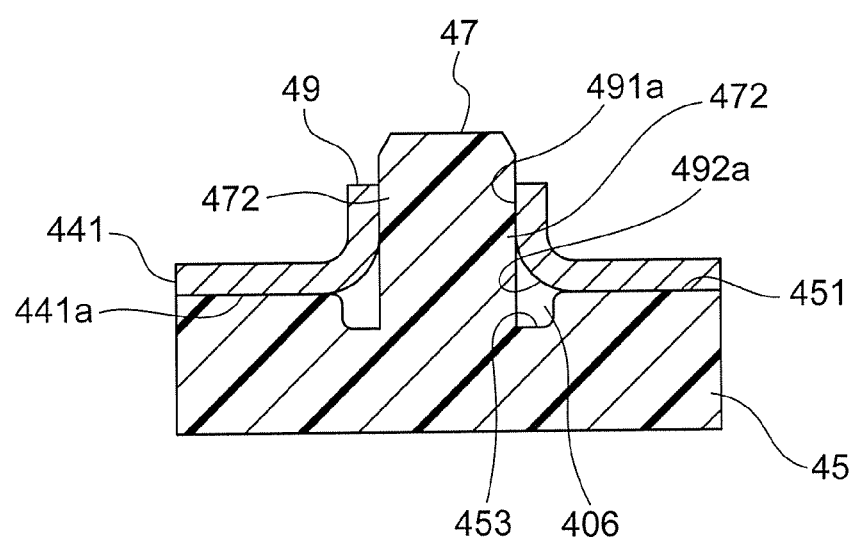
FIG. 17 is a sectional view for illustrating a state in which the second protruding portion of FIG. 14 is press-fitted into a second through hole.

FIG. 17 is a perspective view for illustrating a state in which the second protruding portion 47 of FIG. 14 is press-fitted into a second through hole 401. A second space portion 406 in which a plurality of second ribs 472 are exposed is defined between an inner surface of the second recessed portion 453 and a second hole inclined inner surface 492*a* under a state in which the second protruding portion 47 is press-fitted into the second through hole 401. The second space portion 406 is defined between the second hole inclined inner surface 492*a* and the holder 45 around the entire circumference of the second protruding portion 47. Other configurations are the same as those of the first embodiment.

In the electric driving device 1 described above, the first recessed portion 452 that surrounds the first protruding portion 46 is formed in the holder surface 451. Thus, the first space portion 405 can be more reliably defined between the inner surface of the first recessed portion 452 and the first hole inclined inner surface 482a. Further, a capacity of the first space portion 405 can be increased as compared to that of the first space portion 405 in the first embodiment. As a result, even when a size of foreign matter that may be generated at the time of press-fitting of the first protruding portion 46 into the first through hole 400 is larger than that of foreign matter that may be generated in the first embodiment, the foreign matter can be received in the first space portion 405. Thus, a bus bar can be more reliably held on the holder 45, and the positioning accuracy of the bus bar 44 with respect to the holder 45 can be improved.

Further, even when an inclination angle of the first hole inclined inner surface 482a with respect to an opposed surface 441a is increased, the capacity of the first space portion 405 can be ensured with the first recessed portion 452. As a result, a height of the first protruding portion 46 from the holder surface 451 can be set smaller than that of the first protruding portion 46 in the first embodiment. Thus, a further reduction in size of a bus bar unit 43 and improvement of productivity of the bus bar unit 43 can be achieved.

Still further, when a plurality of bus bar units 43 are manufactured and the first hole inclined inner surfaces 482a of the first through holes 400 have a variation in shape, the capacity of the first space portion 405 can be ensured with the first recessed portion 452. As a result, further improvement of the productivity of the bus bar units 43 can be achieved.

Further, the second recessed portion 453 that surrounds the second protruding portion 47 is also formed in the holder surface 451. Thus, a capacity of the second space portion 406 can also be increased as compared to that of the second space portion 406 in the first embodiment. As a result, the bus bar can be more reliably held on the holder 45, and the positioning accuracy of the bus bar 44 with respect to the holder 45 can be improved. Further, a further reduction in size of the bus bar unit 43 and further improvement of productivity of the bus bar unit 43 can be achieved.

In the first and second embodiments, the first hole inclined inner surface 482a is seen as a curved line that is inclined with respect to the opposed surface 441a when taken along a plane containing an axis of the first through hole 400. However, the first hole inclined inner surface 482a may be formed to be seen as a straight line that is inclined with respect to the opposed surface 441a when taken along the plane containing the axis of the first through hole 400.

Still further, in the first and second embodiments, the second hole inclined inner surface 492a is seen as a curved line that is inclined with respect to the opposed surface 441a when taken along a plane containing an axis of the second through hole 401. However, the second hole inclined inner surface 492a may be formed to be seen as a straight line that is inclined with respect to the opposed surface 441a when taken along the plane containing the axis of the second through hole 401.

Third Embodiment

Figure 18:
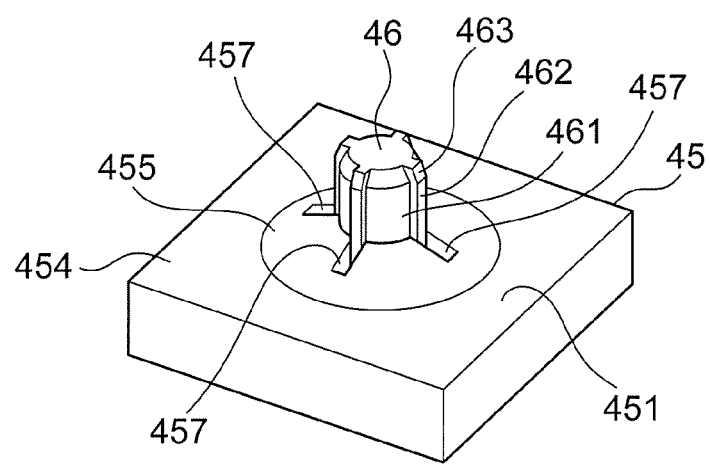
FIG. 18 is a perspective view for illustrating a first protruding portion of an electric driving device according to a third embodiment of this invention.
Figure 19:
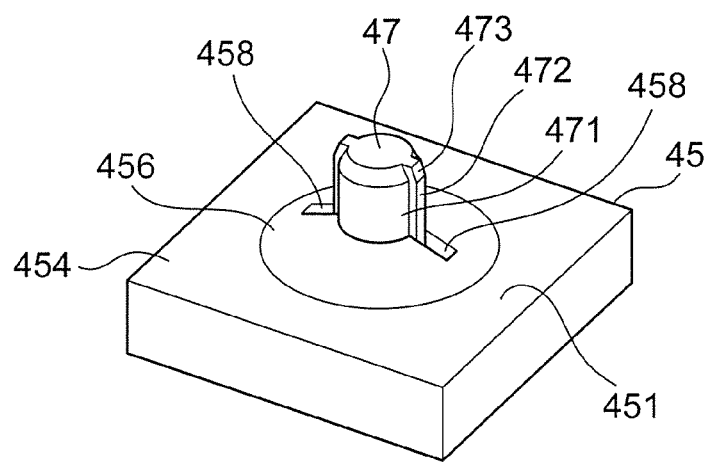
FIG. 19 is a perspective view for illustrating a second protruding portion of the electric driving device according to the third embodiment of this invention.

FIG. 18 is a perspective view for illustrating a first protruding portion 46 of an electric driving device 1 according to a third embodiment of this invention. Further, FIG. 19 is a perspective view for illustrating a second protruding portion 47 of the electric driving device 1 according to the third embodiment of this invention. A holder surface 451 of a holder 45 includes a base surface 454, a first holder inclined surface 455, and a second holder inclined surface 456. The base surface 454 is a flat surface.

As illustrated in FIG. 18, the first holder inclined surface 455 is formed around the first protruding portion 46. The first holder inclined surface 455 is formed around the entire circumference of the first protruding portion 46 between the base surface 454 and the first protruding portion 46. Further, the first holder inclined surface 455 is inclined in a direction of approaching an end portion of the first protruding portion 46 with respect to the base surface 454 from the base surface 454 toward the first protruding portion 46.

The first holder inclined surface 455 has a plurality of first recessed portions 457 that are formed in such a manner as to match positions of a plurality of first ribs 462 in a circumferential direction of the first columnar portion 461, respectively. Thus, in this example, the first holder inclined surface 455 has four first recessed portions 457. The first ribs 462 are exposed inside the first recessed portions 457, respectively. A width dimension of each of the first recessed portions 457 in a circumferential direction of the first protruding portion 46 matches a width dimension of each of the first ribs 462 in the circumferential direction of the first protruding portion 46.

As illustrated in FIG. 19, the second holder inclined surface 456 is formed around the second protruding portion 47. The second holder inclined surface 456 is formed around the entire circumference of the second protruding portion 47 between the base surface 454 and the second protruding portion 47. Further, the second holder inclined surface 456 is inclined in a direction of approaching an end portion of the second protruding portion 47 with respect to the base surface 454 from the base surface 454 toward the second protruding portion 47.

The second holder inclined surface 456 has a plurality of second recessed portions 458 that are formed in such a manner as to match positions of a plurality of second ribs 472 in a circumferential direction of the second columnar portion 471, respectively. Thus, in this example, the second holder inclined surface 456 has two second recessed portions 458. The second ribs 472 are exposed inside the second recessed portions 458, respectively. A width dimension of each of the second recessed portions 458 in a circumferential direction of the second protruding portion 47 matches a width dimension of each of the second ribs 472 in the circumferential direction of the second protruding portion 47.

Figure 20:
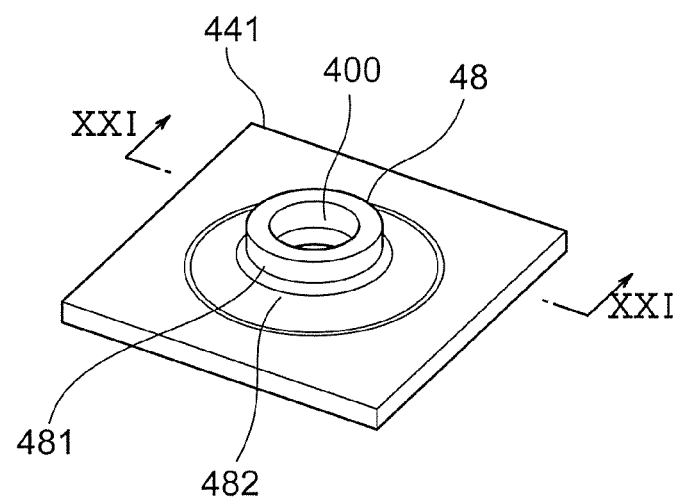
FIG. 20 is a perspective view for illustrating a first through hole of the electric driving device according to the third embodiment of this invention.
Figure 21:
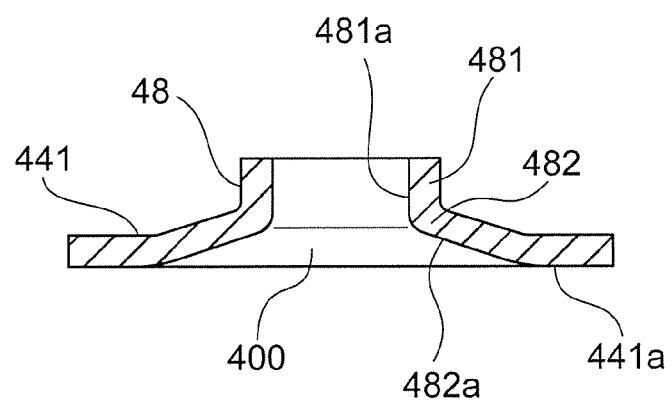
FIG. 21 is a sectional view taken along the line XXI-XXI of FIG. 20.

FIG. 20 is a perspective view for illustrating a first through hole 400 of the electric driving device 1 according to the third embodiment of this invention. FIG. 21 is a sectional view taken along the line XXI-XXI of FIG. 20. As illustrated in FIG. 21, a first hole inclined inner surface 482a is seen as a straight line that is inclined with respect to an opposed surface 441a in a cross section of a first through hole forming portion 48, which is taken along a plane containing an axis of the first through hole 400. Other configurations of the first through hole 400 are the same as those of the first through hole 400 in the first embodiment.

Figure 22:
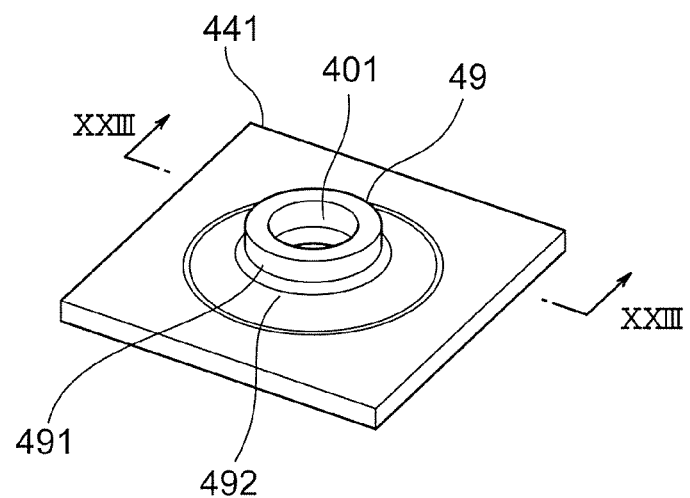
FIG. 22 is a perspective view for illustrating a second through hole of the electric driving device according to the third embodiment of this invention.
Figure 23:
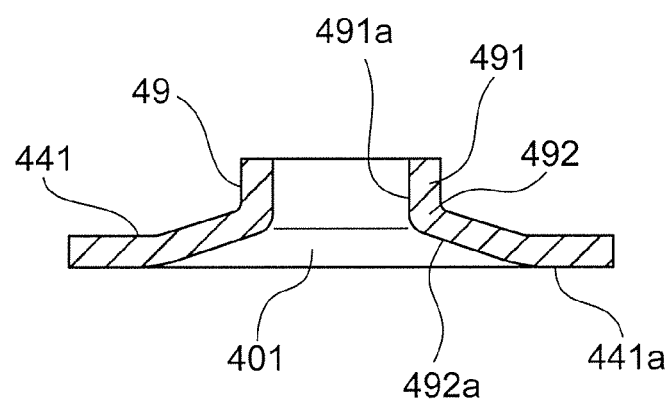
FIG. 23 is a sectional view taken along the line XXIII-XXIII of FIG. 22.

FIG. 22 is a perspective view for illustrating a second through hole 401 of the electric driving device 1 according to the third embodiment of this invention. FIG. 23 is a sectional view taken along the line XXIII-XXIII of FIG. 22. As illustrated in FIG. 23, a second hole inclined inner surface 492a is seen as a straight line that is inclined with respect to the opposed surface 441a in a cross section of a second through hole forming portion 49, which is taken along a plane containing an axis of the second through hole 401. Other configurations of the second through hole 401 are the same as those of the second through hole 401 in the first embodiment.

Figure 24:
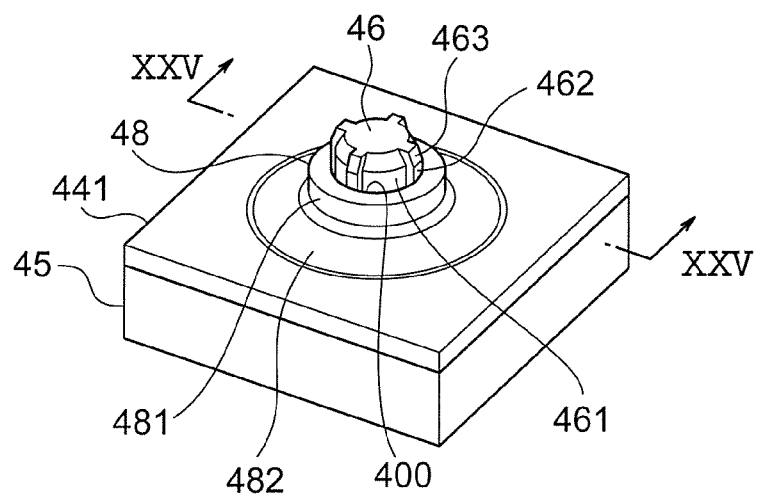
FIG. 24 is a perspective view for illustrating a state in which the first protruding portion of FIG. 18 is press-fitted into the first through hole of a plate-like portion.
Figure 25:
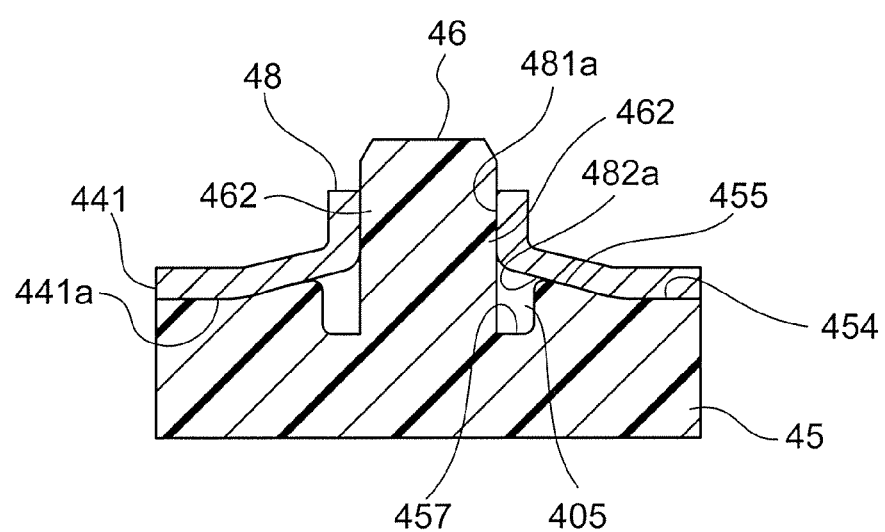
FIG. 25 is a sectional view taken along the line XXV-XXV of FIG. 24.

FIG. 24 is a perspective view for illustrating a state in which the first protruding portion 46 of FIG. 18 is press-fitted into a first through hole 400 of a plate-like portion 441. Further, FIG. 25 is a sectional view taken along the line XXV-XXV of FIG. 24. As illustrated in FIG. 25, a plurality of first space portions 405 are individually defined between inner surfaces of the plurality of first recessed portions 457 and the first hole inclined inner surface 482a under a state in which the first protruding portion 46 is press-fitted into the first through hole 400. Thus, positions of the first space portions 405 in the circumferential direction of the first protruding portion 46 match positions of the first ribs 462 in the circumferential direction of the first protruding portion 46, respectively. Each of the first ribs 462 is exposed inside a corresponding one of the first space portions 405.

The first holder inclined surface 455 is formed to extend along the first hole inclined inner surface 482a. Thus, as illustrated in FIG. 25, the first holder inclined surface 455 is seen as a straight line that is inclined with respect to the base surface 454 in a cross section of the holder surface 451, which is taken along a plane containing an axis of the first protruding portion 46. Further, the first holder inclined surface 455 is in contact with the first hole inclined inner surface 482a except for the first recessed portions 457. This arrangement prevents exposure of an outer peripheral surface of the first columnar portion 461 in the first space portions 405.

Figure 26:
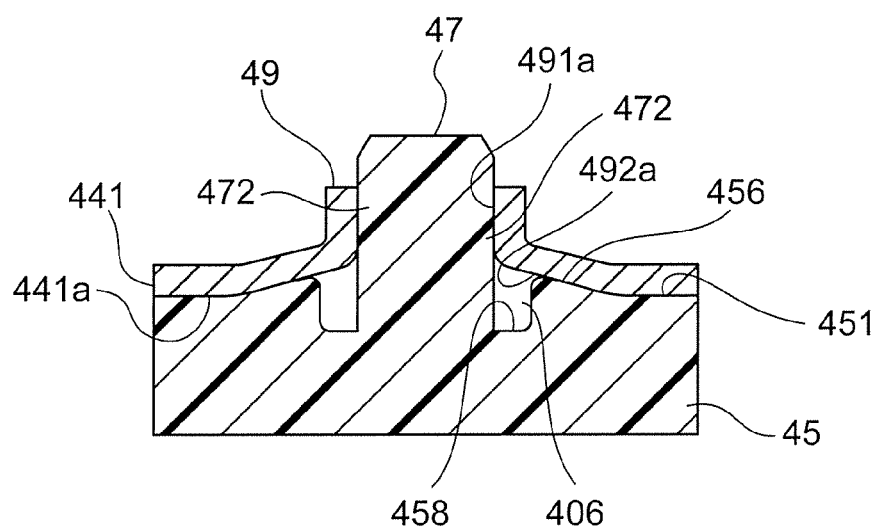
FIG. 26 is a sectional view for illustrating a state in which the second protruding portion of FIG. 19 is press-fitted into the first through hole of the plate-like portion.

FIG. 26 is a perspective view for illustrating a state in which the second protruding portion 47 of FIG. 19 is press-fitted into a first through hole 400 of the plate-like portion 441. A plurality of second space portions 406 are individually defined between inner surfaces of the plurality of second recessed portions 458 and the second hole inclined inner surface 492a under a state in which the second protruding portion 47 is press-fitted into the second through hole 401. Thus, positions of the second space portions 406 in the circumferential direction of the second protruding portion 47 match positions of the second ribs 472 in the circumferential direction of the second protruding portion 47, respectively. Each of the second ribs 472 is exposed inside a corresponding one of the second space portions 406.

The second holder inclined surface 456 is formed to extend along the second hole inclined inner surface 492a. Thus, the second holder inclined surface 456 is seen as a straight line that is inclined with respect to the base surface 454 in a cross section of the holder surface 451, which is taken along a plane containing an axis of the second protruding portion 47. Further, the second holder inclined surface 456 is in contact with the second hole inclined inner surface 492a except for the second recessed portions 458. This arrangement prevents exposure of an outer peripheral surface of the second columnar portion 471 in the second space portions 406. Other configurations are the same as those of the first embodiment.

In the electric driving device 1 described above, the plurality of first recessed portions 457 are formed in such a manner as to match the positions of the plurality of first ribs 462 in the circumferential direction of the first columnar portion 461, respectively. Further, the holder surface 451 includes the first holder inclined surface 455 formed to extend along the first hole inclined inner surface 482a. Thus, the plurality of first space portions 405 in which the plurality of first ribs 462 are individually exposed can be defined between the inner surfaces of the first recessed portions 457 and the first holder inclined surface 455. As a result, even when shavings of the first ribs 462 are generated as foreign matter at the time of press-fitting of the first protruding portion 46 into the first through hole 400, the foreign matter can be received in the first space portions 405. Thus, a bus bar 44 can be more reliably held on the holder 45, and the positioning accuracy of the bus bar 44 with respect to the holder 45 can be improved.

Further, the contact of the first hole inclined inner surface 482a with the first holder inclined surface 455 can prevent exposure of the outer peripheral surface of the first columnar portion 461 in the first space portions 405. In this manner, movement of foreign matter into gaps between the outer peripheral surface of the first columnar portion 461 and the first hole cylindrical inner surface 481a can be prevented. As a result, a state in which foreign matter is confined in the first space portions 405 can be more reliably maintained. Thus, intrusion of foreign matter into the control unit 4 can be more reliably prevented.

Further, the plurality of second recessed portions 458 are formed in such a manner as to match the positions of the plurality of second ribs 472 in the circumferential direction of the second columnar portion 471, respectively. Further, the holder surface 451 includes the second holder inclined surface 456 that is formed to extend along the second hole inclined inner surface 492a. Thus, even when shavings of the second ribs 472 are generated as foreign matter at the time of press-fitting of the second protruding portion 47 into the second through hole 401, the foreign matter can be received in the second space portions 406. Further, a state in which the foreign matter is confined in the second space portions 406 can be more reliably maintained.

The first holder inclined surface 455 that is formed to extend along the first hole inclined inner surface 482a and the second holder inclined surface 456 that is formed to extend along the second hole inclined inner surface 492a may be applied to the holder surface 451 according to the second embodiment.

REFERENCE SIGNS LIST 1 electric driving device, 3 motor, 4 control unit, 43 bus bar unit, 44 bus bar, 45 holder, 46 first protruding portion, 47 second protruding portion, 48 first through hole forming portion, 49 second through hole forming portion, 400 first through hole, 401 second through hole, 405 first space portion, 441 plate-like portion, 441a opposed surface, 442 first terminal, 443 second terminal, 451 holder surface, 452,457 first recessed portion, 455 first holder inclined surface, 461 first columnar portion, 462 first rib, 471 second columnar portion, 472 second rib, 481a first hole cylindrical inner surface, 482a first hole inclined inner surface, 491a second hole cylindrical inner surface, 492a second hole inclined inner surface

The invention claimed is:
1. An electric driving device, comprising:
a motor; and
a control unit configured to control the motor,
wherein the control unit includes:
   a holder having a holder surface; and
   a bus bar arranged on the holder surface, wherein the bus bar has a plate-like portion placed on the holder surface in an overlapping manner, wherein the plate-like portion has an opposed surface opposed to the holder surface, wherein the holder has a first protruding portion protruding from the holder surface, wherein the first protruding portion has a first columnar portion and a plurality of first ribs formed on an outer peripheral surface of the first columnar portion so as to be spaced apart from each other in a circumferential direction of the first columnar portion, wherein the plate-like portion has a first through hole into which the first protruding portion is press-fitted, wherein the first through hole is defined by a first through hole forming portion formed in a cylindrical shape so as to project from the plate-like portion to a side opposite to the opposed surface, wherein the first through hole has an inner surface including:
- a first hole inclined inner surface that is inclined in a direction of reducing an inner diameter of the first through hole with respect to the opposed surface from the opposed surface toward an end portion of the first through hole forming portion; and
- a first hole cylindrical inner surface extending from the first hole inclined inner surface to the end portion of the first through hole forming portion with the inner diameter of the first through hole kept constant, wherein the first protruding portion is press-fitted into the first through hole under a state in which the plurality of first ribs are in contact with the first hole cylindrical inner surface, and wherein the first protruding portion and the first through hole are connected by only a press-fit joint.

2. The electric driving device according to claim 1, further comprising a first space portion defined between the first hole inclined inner surface and the holder, in which the plurality of first ribs are exposed.

3. The electric driving device according to claim 2,
wherein the holder surface has a first recessed portion that surrounds the first protruding portion, and
wherein the first space portion is defined between an inner surface of the first recessed portion and the first hole inclined inner surface.

4. The electric driving device according to claim 2,
wherein the holder surface includes a first holder inclined surface formed so as to extend along the first hole inclined inner surface,
wherein the first holder inclined surface has a plurality of first recessed portions that are formed in such a manner as to match positions of the plurality of first ribs in the circumferential direction of the first columnar portion, respectively, and wherein the first space portion is individually defined between an inner surface of each of the plurality of first recessed portions and the first hole inclined inner surface.

5. The electric driving device according claim 1, wherein a dimension of the first hole cylindrical inner surface in an axial direction of the first through hole is larger than a thickness of the plate-like portion.

6. The electric driving device according to claim 1,
wherein the holder has a second protruding portion protruding from the holder surface,
wherein the second protruding portion has a second columnar portion and a plurality of second ribs formed on an outer peripheral surface of the second columnar portion so as to be spaced apart from each other in a circumferential direction of the second columnar portion, wherein the plate-like portion has a second through hole into which the second protruding portion is press-fitted, wherein the second through hole is defined by a second through hole forming portion formed in a cylindrical shape so as to project from the plate-like portion to a side opposite to the opposed surface, wherein the second through hole has an inner surface including:
- a second hole inclined inner surface that is inclined in a direction of reducing an inner diameter of the second through hole with respect to the opposed surface from the opposed surface toward an end portion of the second through hole forming portion; and
- a second hole cylindrical inner surface extending from the second hole inclined inner surface to the end portion of the second through hole forming portion with the inner diameter of the second through hole kept constant, and wherein the second protruding portion is press-fitted into the second through hole under a state in which the plurality of second ribs are in contact with the second hole cylindrical inner surface.

7. The electric driving device according to claim 6, wherein the number of second ribs of the second protruding portion is smaller than the number of first ribs of the first protruding portion.

8. The electric driving device according to claim 7,
wherein the number of first ribs of the first protruding portion is four, and
wherein the number of second ribs of the second protruding portion is two.

9. The electric driving device according to claim 1, wherein the bus bar includes terminals projecting from the plate-like portion to a side opposite to the holder.

10. An electric power steering device, comprising the electric driving device of claim 1.

* * * * *